US009343225B2

(12) United States Patent
Onizuka et al.

(10) Patent No.: US 9,343,225 B2
(45) Date of Patent: May 17, 2016

(54) POWER RECEIVING DEVICE, POWER TRANSMITTING DEVICE AND CONTROL DEVICE

(71) Applicants: Kohei Onizuka, Tokyo (JP); Shoji Otaka, Yokohama (JP); Hiroaki Ishihara, Kawasaki (JP); Fumi Moritsuka, Kawasaki (JP)

(72) Inventors: Kohei Onizuka, Tokyo (JP); Shoji Otaka, Yokohama (JP); Hiroaki Ishihara, Kawasaki (JP); Fumi Moritsuka, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 740 days.

(21) Appl. No.: 13/717,477

(22) Filed: Dec. 17, 2012

(65) Prior Publication Data

US 2013/0181537 A1 Jul. 18, 2013

(30) Foreign Application Priority Data

Jan. 13, 2012 (JP) .................................. 2012-005465

(51) Int. Cl.
| | |
|---|---|
| H01F 27/00 | (2006.01) |
| H01F 38/14 | (2006.01) |
| H02J 5/00 | (2016.01) |
| H02J 7/02 | (2016.01) |

(52) U.S. Cl.
CPC ................ *H01F 38/14* (2013.01); *H02J 5/005* (2013.01); *H02J 7/025* (2013.01)

(58) Field of Classification Search
USPC ........................................................ 307/104
See application file for complete search history.

(56) References Cited

U.S. PATENT DOCUMENTS

| | | | |
|---|---|---|---|
| 5,892,300 | A | 4/1999 | Rydval |
| 6,307,468 | B1 | 10/2001 | Ward |
| 6,889,905 | B2 | 5/2005 | Shigemasa et al. |
| 6,934,557 | B2 | 8/2005 | Sekine et al. |
| 7,049,935 | B1 | 5/2006 | Wauidart et al. |

(Continued)

FOREIGN PATENT DOCUMENTS

| | | |
|---|---|---|
| CN | 1411099 A | 4/2003 |
| CN | 102055250 A | 5/2011 |

(Continued)

OTHER PUBLICATIONS

Extended European Search Report dated Dec. 10, 2014 issued in counterpart European Application No. 12197907.4.

(Continued)

*Primary Examiner* — Ronald W Leja
(74) *Attorney, Agent, or Firm* — Holtz, Holtz & Volek PC

(57) ABSTRACT

There provided a power receiving device connectable with a first load circuit operating according to AC power from a power transmitting device in which the power receiver receives the AC power from the power transmitting device via magnetic coupling, the impedance adjuster is capable of converting at least one of voltage and current of the AC power received at the power receiver, the controller controls increase in output voltage of the power transmitting device, the AC power is supplied to the first load circuit via the impedance adjuster when the first load circuit is connected to the power receiving device, and the controller controls the impedance adjuster such that an input impedance of the impedance adjuster is lower than an input impedance of the first load circuit during at least a part of a time period where the output voltage of the power transmitting device is increased.

11 Claims, 8 Drawing Sheets

(56) References Cited

U.S. PATENT DOCUMENTS

| | | | |
|---|---|---|---|
| 7,119,311 B2 | 10/2006 | Makoto | |
| 7,522,878 B2 | 4/2009 | Baarman | |
| 7,868,482 B2 * | 1/2011 | Greene | H02J 1/10 307/82 |
| 7,953,369 B2 | 5/2011 | Baarman | |
| 8,050,068 B2 | 11/2011 | Hussmann et al. | |
| 8,116,681 B2 | 2/2012 | Baarman | |
| 8,116,683 B2 | 2/2012 | Baarman | |
| 8,301,079 B2 | 10/2012 | Baarman | |
| 8,301,080 B2 | 10/2012 | Baarman | |
| 8,315,561 B2 | 11/2012 | Baarman | |
| 8,446,045 B2 | 5/2013 | Smith et al. | |
| 8,716,974 B2 | 5/2014 | Sakoda et al. | |
| 2009/0271047 A1 | 10/2009 | Wakamatsu | |
| 2009/0302688 A1 | 12/2009 | Boys | |
| 2010/0045114 A1 | 2/2010 | Sample et al. | |
| 2010/0081379 A1 | 4/2010 | Cooper et al. | |
| 2010/0109443 A1 * | 5/2010 | Cook | H01Q 1/2225 307/104 |
| 2010/0187913 A1 | 7/2010 | Smith et al. | |
| 2010/0213770 A1 | 8/2010 | Kikuchi | |
| 2011/0025132 A1 | 2/2011 | Sato | |
| 2011/0109263 A1 | 5/2011 | Sakoda et al. | |
| 2011/0189954 A1 | 8/2011 | Baarman | |
| 2011/0235800 A1 | 9/2011 | Furukawa et al. | |
| 2011/0269399 A1 | 11/2011 | Baarman | |
| 2011/0275319 A1 | 11/2011 | Baarman | |
| 2011/0298294 A1 | 12/2011 | Takada et al. | |
| 2011/0298298 A1 | 12/2011 | Baarman | |
| 2012/0001485 A1 | 1/2012 | Uchida | |
| 2012/0001493 A1 | 1/2012 | Kudo et al. | |
| 2012/0112531 A1 | 5/2012 | Kesler et al. | |
| 2012/0146425 A1 * | 6/2012 | Lee | H02J 5/005 307/104 |
| 2012/0175968 A1 | 7/2012 | Katsunaga et al. | |
| 2012/0205989 A1 | 8/2012 | Baarman | |
| 2012/0235509 A1 | 9/2012 | Ueno et al. | |
| 2013/0002034 A1 | 1/2013 | Onizuka et al. | |
| 2013/0257165 A1 | 10/2013 | Singh | |

FOREIGN PATENT DOCUMENTS

| | | |
|---|---|---|
| JP | 10-091694 A | 4/1998 |
| JP | 11-188113 A | 7/1999 |
| JP | 2000-148932 A | 5/2000 |
| JP | 2001-086030 A | 3/2001 |
| JP | 2001-238372 A | 8/2001 |
| JP | 2004-166384 A | 6/2004 |
| JP | 2005-168246 A | 6/2005 |
| JP | 2006-517778 A | 7/2006 |
| JP | 2009-268181 A | 11/2009 |
| JP | 2009539343 A | 11/2009 |
| JP | 2010154696 A | 7/2010 |
| JP | 2011250498 A | 12/2011 |
| WO | WO 2004/073166 A2 | 8/2004 |
| WO | WO 2008/118178 A1 | 10/2008 |
| WO | WO 2009/037821 A1 | 3/2009 |
| WO | 2011036659 A2 | 3/2011 |
| WO | WO 2011/033660 A1 | 3/2011 |

OTHER PUBLICATIONS

Chinese Office Action dated Aug. 13, 2014 in counterpart Chinese Application No. 201310009392.3.
Related U.S. Appl. No. 13/461,097: First Named Inventor: Takeshi Ueno: Title: "Wireless Power Transmission Device"; Filed: May 1, 2012.
Related U.S. Appl. No. 13/342,381, filed Jan. 3, 2012.
Applicant-provided Background Art Information Sheet.
Japanese Office Action dated Oct. 31, 2014, issued in counterpart Japanese Application No. 2012-005465.
Chinese Office Action (and English translation thereof) dated Apr. 1, 2015, issued in counterpart Chinese Application No. 201310009392.3.

* cited by examiner

POWER RECEIVING DEVICE, POWER TRANSMITTING DEVICE AND CONTROL DEVICE

CROSS REFERENCE TO RELATED APPLICATIONS

This application is based upon and claims the benefit of priority from the prior Japanese Patent Application No. 2012-005465, filed on Jan. 13, 2012, the entire contents of which are incorporated herein by reference.

FIELD

Embodiments described herein relate to power transmission.

BACKGROUND

There is known a wireless power transmitting apparatus including a power transmitting device and a power receiving device receiving power from the power transmitting device. The wireless power transmitting apparatus has a problem in that load variation or the like generates excessive inrush current, resulting in breaking of an active device such as a transistor on a power receiving side. Conventionally, in order to address this problem, a method of preventing inrush current by shorting a circuit on the power receiving side to separate a resonator circuit has been adopted.

The conventional method is effective for protecting elements on the power receiving side. However, there is a possibility that gradual increase in power transmission voltage in a state where a load impedance is high (light load) generates excessive current in a device on a power transmitting side. This results in breaking of elements on the power transmitting side. Furthermore, it is required to use a device tolerant to a higher current value than that in an actual power transmitting state, as a power transmitting device. This leads to increase in cost of the device.

DETAILED DESCRIPTION

Figure 1:
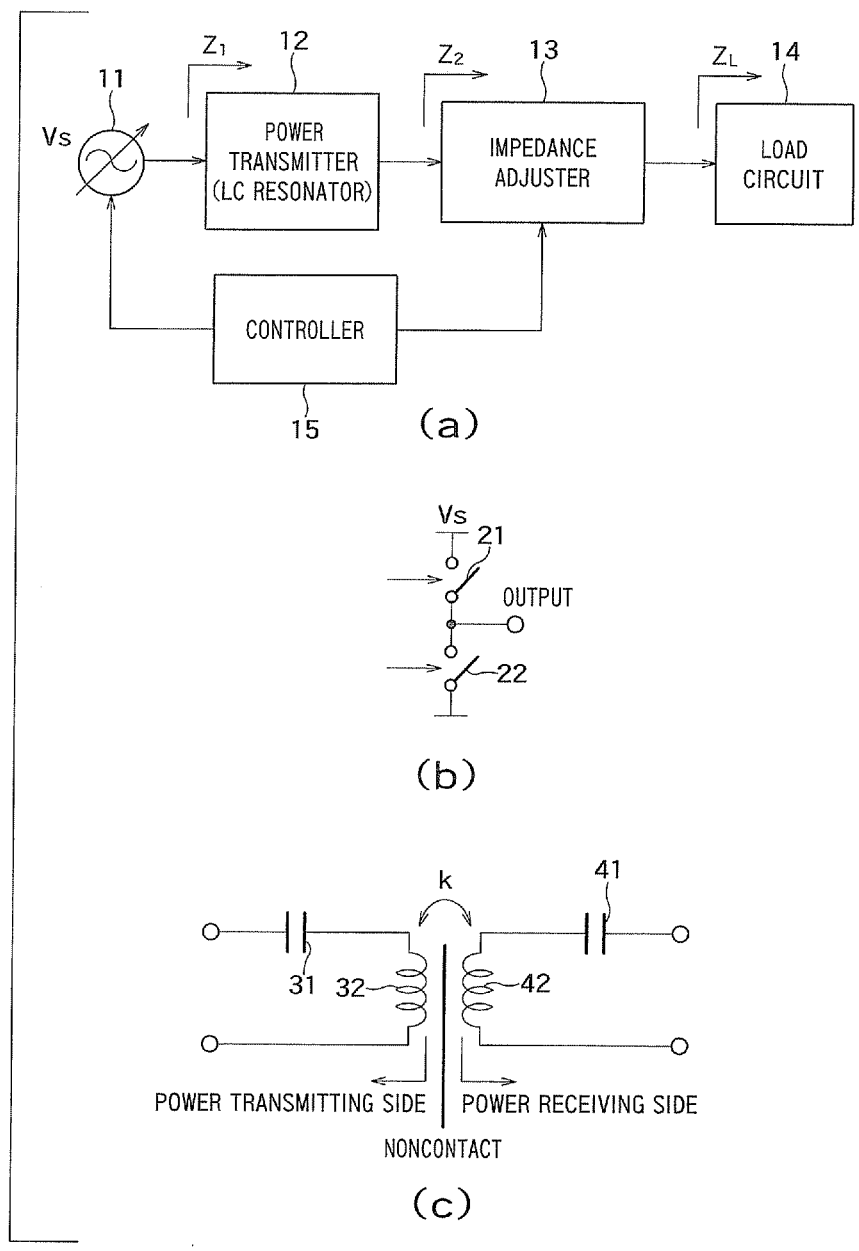
FIG. 1 shows diagrams showing a wireless power transmitting apparatus according to a first embodiment.

According to some embodiments, there provided a power receiving device connectable with a first load circuit operating according to AC power from a power transmitting device, including: a power receiver, an impedance adjuster and a controller.

The power receiver receives the AC power from the power transmitting device via magnetic coupling.

The impedance adjuster is capable of converting at least one of voltage and current of the AC power received at the power receiver.

The controller controls increase in output voltage of the power transmitting device.

The AC power is supplied to the first load circuit via the impedance adjuster when the first load circuit is connected to the power receiving device.

The controller controls the impedance adjuster such that an input impedance of the impedance adjuster is lower than an input impedance of the first load circuit during at least a part of a time period where the output voltage of the power transmitting device is increased.

Hereinafter, referring to drawings, embodiments will be described in detail.

First Embodiment

FIG. 1(a) is a block diagram of a wireless power transmitting apparatus according to a first embodiment.

This wireless power transmitting apparatus includes: an AC power generator 11 that generates AC power; a noncontact power transmitter 12 which includes at least two inductive elements and at least one capacitive element; an impedance adjuster (an impedance adjusting circuit) 13 which converts relationship between input voltage and output voltage or relationship between input current and output current or both of them for performing impedance conversion; a controller 15 which controls the AC power generator 11 and the impedance adjuster 13; and a load circuit 14 which consumes received power.

Figure 2:
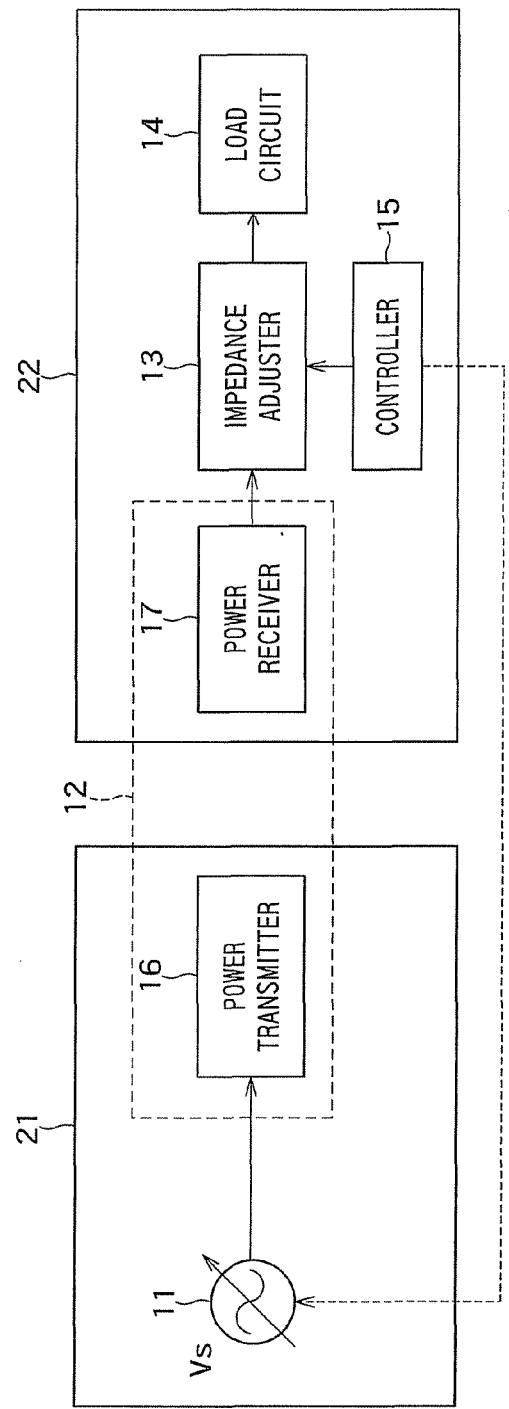
FIG. 2 is a diagram showing a power transmitting device and a power receiving device in the wireless power transmitting apparatus in FIG. 1.

In actuality, as shown in FIG. 2, this wireless power transmitting apparatus includes two devices, which are a power transmitting device 21 and a power receiving device 22. The power transmitter 12 shown in FIG. 1 includes a power transmitter 16 on the side of the power transmitting device 21, and a power receiver 17 on the side of the power receiving device 22.

The power transmitting device 21 includes the AC power generator 11 and the power transmitter 16. The power receiving device 22 includes the power receiver 17, the impedance adjuster 13, the load circuit 14 and the controller 15. The load circuit 14 may be an independent device, instead of being included in the power receiving device 22, and may be included in another device.

The controller 15 controls the impedance adjuster 13 and the AC power generator 11. A control signal output from the controller 15 is transmitted to the power transmitting device 21 on the opposite side using a wireless communication unit or a wire communication unit. The controller 15 may be included in the power transmitting device 21 instead of the power receiving device 22. The controller 15 may be separated from the power receiving device 22 and the power transmitting device 21, and independently exist as a control device. Instead, the controller 15 may be included in both the power transmitting device and the power receiving device in a distributed manner. In this case, the signal between the controllers 15 in the distributed configuration is transmitted using a wireless communication unit or a wire communication unit. Likewise, the control device may exist as a plurality of devices in a distributed manner.

FIG. 1(b) shows an embodiment in the case where the AC power generator 11 is realized using an inverter circuit.

The upper and lower switches 21 and 22 are complementarily operated to thereby generate AC voltage and current (AC power) at an output terminal. The generated power is input into the noncontact power transmitter 12, more specifically, into the power transmitter 16.

FIG. 1(c) is an embodiment of the noncontact power transmitter 12.

The noncontact power transmitter 12 includes two LC resonators. The LC resonator on the power transmitting side includes a capacitive element 31 and an inductive element 32 which are connected in series with each other. The LC resonator on the power receiving side includes an inductive element 42 and a capacitive element 41 which are connected in series with each other. The LC resonator on the power transmitting side corresponds to the power transmitter 16 in FIG. 2. The LC resonator on the power receiving side corresponds to the power receiver 17 in FIG. 2.

In the configuration in FIG. 1(c), with use of magnetic coupling between inductive elements 32 and 42 that are opposite to each other, the capacitive elements 31 and 41 which are respectively connected in series to inductive elements 32 and 42 are resonated together with the two inductive elements 32 and 42 around a power transmission frequency, which realizes high efficiency wireless power transmission from the power transmitting device 21 to the power receiving device 22.

A coupling coefficient "k" between the inductive elements 32 and 42 may be any value which is one or less according to the sizes of the inductive elements and the transmission distance. In this example, the capacitive elements are provided on both the power transmitting side and the power receiving side. Instead, for instance, a configuration where the capacitive element 31 is provided on the power receiving side but the capacitive element 41 is not provided on the power transmitting side can be adopted.

The load circuit 14 in FIG. 1 may be a secondary battery or the like, which has an energy storing function, or what does not have an energy storing function.

Here, an input impedance of the load circuit 14, which is an input voltage divided by an input current, is denoted by "ZL". Likewise, an input impedance of the impedance adjuster 13 is denoted by "Z2". An input impedance of the power transmitter 12 is denoted by "Z1".

In the present embodiment, when a power transmission voltage "Vs" is increased for activating the AC power generator 11 or increasing transmission power, a current that is the power transmission voltage "Vs" divided by the impedance "Z1" is generated in the AC power generator 11.

In the case where the state of the impedance adjuster 13 is fixed, the higher the value of "ZL", the lower the value of the impedance "Z1" becomes around the resonant frequency. Accordingly, in a state where the supplied voltage does not reach the operation voltage and the load circuit 14 does not consume current or the consumed current is low at a light load, the impedance "ZL" becomes infinity or a large value but the impedance "Z1" becomes a low value. This generates overcurrent at the AC power generator 11, and breaks switch elements or the like (the path of current is up to the power transmitting side in FIG. 1(c) and the current does not reach the power receiving side). In order to solve the problem, for instance, use of a switch element with a high withstanding current value increases the cost for implementing the AC power generator.

Thus, in the present embodiment, the impedance adjuster 13 is provided between the power transmitter 12 and the load circuit 14. Furthermore, the controller 15 for controlling the impedance adjuster 13 and the AC power generator 11 is provided. The control of the impedance adjuster 13 by the controller 15 only requires at least a trigger for causing the impedance adjuster 13 to start adjustment of impedance (reduction in impedance). Furthermore, the control may include processes on the speed of adjustment of the impedance, the adjustment time period and the temporal stop. The control of the AC power generator 11 by the controller 15 only requires at least a trigger for starting increase the output voltage of the AC power generator 11 (power transmitting device). Furthermore, the control may include processes on the speed of increase in output voltage, the increasing time period and the temporal stop. The impedance adjuster 13 can convert at least one of the voltage and current of AC power received by the power receiver 17.

In the case where the load circuit 14 is connected to the power receiving device to allow AC power to be supplied to the load circuit via the impedance adjuster 13, the controller 15 controls the AC power generator 11 such that the power transmission voltage "Vs" gradually increases to reach a target value (operation voltage of the load circuit), and further controls the impedance adjuster 13 such that "Z2<ZL" during this increase. More specifically, this controller appropriately increases "Z2" while satisfying "Z2<ZL", and finally realizes "Z2=ZL" when the power transmission voltage "Vs" reaches the target value. The state does not necessarily become "Z2=ZL" at the final state. One of the terms may be higher. According to such control, even before the power transmission voltage "Vs" reaches the target value, the current flows not only on the power transmitting side but also on the power receiving side, and thus prevents overcurrent at the AC power generator 11. Note that, if the power transmission voltage "Vs" is increased while "Z2" is at a constant low value, the current does not flow to the power transmitting device and power does not reach the power receiving side. To address this, the impedance "Z2" is gradually increased.

Here, the controller 15 can calculate values of "Z2" and "ZL" from, for instance, any or both of the input voltages and input currents of the impedance adjuster 13 and the load circuit 14. This allows appropriate increase in "Z2" while satisfying "Z2<ZL". Instead, the increasing pattern (increasing rate) and the first target value of the power transmission voltage of the power transmitting device "Vs" may be preliminarily fixed, the increasing pattern (increasing rate) of "Z2" and the second target value of the impedance adjuster 13 may be preliminarily fixed, and the controller 15 may control the AC power generator 11 and the impedance adjuster 13 on the basis thereof.

Note that, at the state where the power transmission voltage "Vs" reaches the target value (i.e., the operation voltage of the load circuit 14), current flows into the load circuit 14, and the load circuit 14 becomes a heavy load state (the input impedance becomes low).

As described above, as the power transmission voltage "Vs" increases, the impedance "Z1" increases. The increase prevents overcurrent from occurring at the AC power generator 11.

In the present embodiment, the entire received power is input into the load circuit 14 except for power consumption in the impedance adjuster 13.

The above description describes the case of gradually increasing the power transmission voltage. However, even in the case where the power of the load circuit is abruptly cut, the present embodiment is effective. In the case of cutting the power, the input of the load circuit 14 instantaneously becomes the high impedance. Accordingly, when the controller 15 detects cutting of the power, this controller controls the impedance adjuster 13 such that the input impedance "Z2" of the impedance adjuster 13 becomes lower than "ZL". This control can solve the problem in that, when the power source is cut, overcurrent flows through the AC power generator 11 to break elements.

As described above, according to the present embodiment, even when the power transmitting device is activated in the state where the impedance of the load circuit is higher than that in an actual power transmitting state, overcurrent does not occur in elements on the power transmitting side. Accordingly, even in the case of using elements with low values of withstanding current and withstanding voltage, the elements can be prevented from being broken when the power transmitting device is activated. That is, the current capacity of the power transmitting device can be designed to be small.

Second Embodiment

Figure 3:
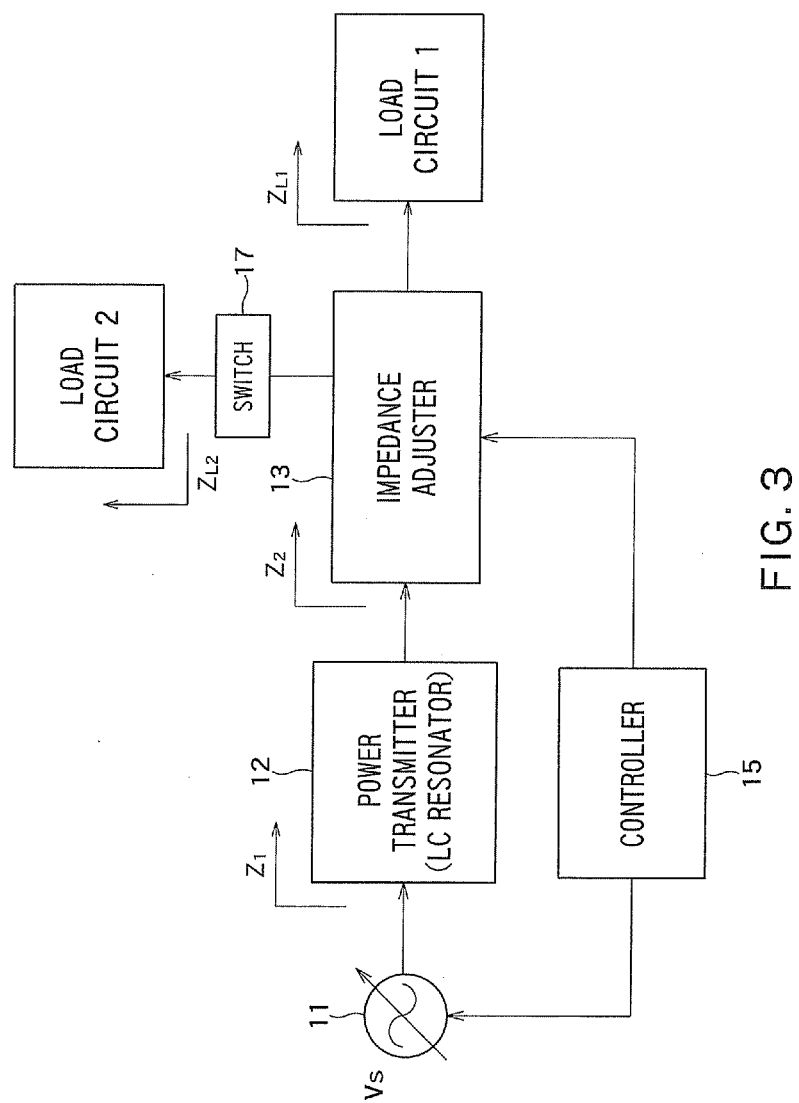
FIG. 3 is a diagram showing a wireless power transmitting apparatus according to a second embodiment.

FIG. 3 is a block diagram of a wireless power transmitting apparatus according to a second embodiment.

In the present embodiment, at least two load circuits (load circuits 1 and 2) are connected to the impedance adjuster 13. The impedance adjuster 13 plays a role of setting electricity paths to the load circuits 1 and 2.

It is provided that an input impedance of the load circuit 1 is denoted by "ZL1", and an input impedance of the load circuit 2 is denoted by "ZL2". For instance, in the case where the impedance "ZL1" is a significantly high value or in an open state, the impedance adjuster 13 sets the electricity path such that current flows into the load circuit 2 having a relatively low input impedance "ZL2". Thus, the relationship of "Z2=(ZL1×ZL2)/(ZL1+ZL2)≈ZL2" holds, and the impedance "Z1" has a high value. As a result, even if the power transmission voltage "Vs" is increased according to activation of the AC power generator 11 or increase in transmitting power, overcurrent is prevented from occurring at the AC power generator 11.

Thus, until the load circuit 1 operates, turning on the switch of the load circuit 2 allows the power up to rising of the power transmission voltage to be effectively used by the load circuit 2. That is, surplus power occurred at impedance adjustment can be effectively used. Any of a storage battery with a low voltage and devices operating at a low power may be used as the load circuit 2. Instead, the load circuit 2 may be a resistor for disposing of power.

Third Embodiment

FIG. 4(a) shows a diagram of an overall configuration of a wireless power transmitting apparatus according to a third embodiment. FIG. 4(b) shows a circuit diagram of an impedance adjuster 13. The block diagram of the wireless power transmitting apparatus in FIG. 4(a) is the same as that in FIG. 1(a).

In the present embodiment, the impedance adjuster 13 has both a voltage boosting function and a rectification function.

Two switches SW1 and SW2 in the impedance adjuster 13 do not conduct at the same time. The switching frequency is set to a value equivalent to or higher than the frequency of output voltage and current of the AC power generator 11.

In this configuration, current energy is stored in an inductive element 53 of an input unit during a time period where the switch SW1 conducts. If the switch SW 1 is opened, a high voltage occurs at both ends of the inductive element 53. This voltage is added to the input signal, thereby acquiring a boosting effect (high DC). That is, the impedance is converted.

The switches SW1 and SW2 and two diodes 51 and 52 configure a full wave rectifier to thereby realize the rectification function.

The controller 15 adjusts the duty cycles of the switches SW1 and SW2 (adjusts duty ratios) to thereby change the boosting level. For instance, in the case where the value of "ZL" is high, this controller controls boosting such that the value of "Z2" is reduced. To acquire high boosting voltage (low input impedance of the impedance adjusting circuit), the "on" period of the SW1 is shortened and the "on" period of the SW2 is extended. In the case of decreasing the boosting level (increasing the input impedance of the impedance adjusting circuit), the period is changed in the reversed direction. Gradual decrease in boosting level allows the impedance Z2 to be gradually increased.

Fourth Embodiment

FIG. 5(a) shows a diagram of an overall configuration of a wireless power transmitting apparatus according to a fourth embodiment. FIG. 5(b) shows a circuit diagram of an impedance adjuster 13. The block diagram of the wireless power transmitting apparatus in FIG. 5(a) is the same as that in FIG. 1(a).

In the present embodiment, the impedance adjuster 13 includes a full wave rectification circuit 71 and a switched capacitor booster circuit 72.

"$\phi 1$" and "$\phi 2$" denotes phases of control signals of respective switches. In the present embodiment, in a normal state (without boosting), the controller 15 controls the impedance adjuster 13 such that the switch with "$\phi 1$" is fixed to be "on" and the switch with $\phi 2$ is fixed to be "off". At this time, capacitive elements C1 and C2 become circuits connected in parallel and function as a smoothing capacitor. Provided that diode elements 61, 62, 63 and 64 in the full wave rectification circuit have ideal characteristics, the input impedance Z2 of the impedance adjuster 13 can be represented by a theoretical equation "$Z2=(\pi^2/8) \cdot ZL$".

Meanwhile, in the case where the impedance Z2 is required to be decreased as the power transmission voltage "Vs" increases, the controller 15 controls the impedance adjuster 13 such that the switches with "$\phi 1$" and "$\phi 2$" perform a complementary switching operation. At this time, if the switch with "$\phi 1$" is "on", the capacitive elements C1 and C2 are charged; if the switch with "$\phi 2$" is on, boosting by serial connection of the capacitive elements C1 and C2 is attained. As a result, the impedance Z2 decreases lower than that by the theoretical equation. This decrease can prevent overcurrent from occurring at the AC power generator 11. The frequency and duty of the switching signal may have any value. To increase the amount of boosting, a capacitance changing instruction may be issued to turn on the switch, thereby connecting a capacitive element C2' to the capacitive element C2 in parallel, as shown in the drawing.

As described above, according to the present embodiment, the switching converter (switched capacitor booster circuit), which has a low loss, is used for impedance conversion, thereby allowing the power efficiency of the entire transmitting apparatus to be increased.

Fifth Embodiment

Figure 6:
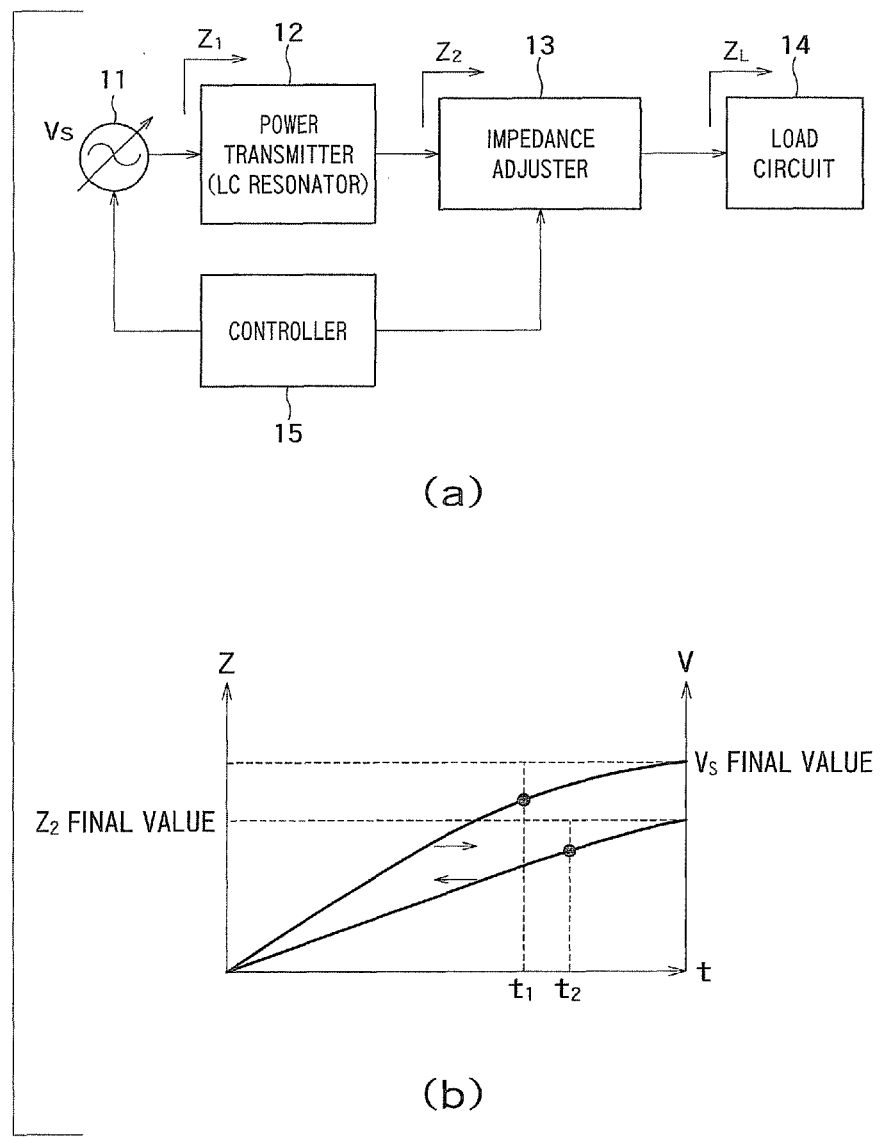
FIG. 6 shows diagrams showing relationship between a voltage increasing rate and an impedance increasing rate.

FIG. 6(a) shows a diagram of an overall configuration of a wireless power transmitting apparatus according to a fifth embodiment. FIG. 6(b) shows temporal waveforms of control instruction values of a controller 15. The block diagram of the wireless power transmitting apparatus in FIG. 6(a) is the same as that in FIG. 1(a).

In the present embodiment, the controller 15 outputs an instruction value such that, during increase in power transmission voltage "Vs", the changing rate of the impedance "Z2" is lower than that of the power transmission voltage "Vs".

For instance, it is provided that "t1" is a time at which the power transmission voltage "Vs" reaches 80% of the final value (first target value), and "t2" is a time at which the impedance "Z2" reaches 80% of the final value (second target value). At this time, it is set that "t1<t2". Each monotonous increase can prevent that the current value of the AC power generator 11 significantly increase to provoke overcurrent even if the impedance "ZL" varies or the coupling coefficient "k" varies during increase in the power transmission voltage "Vs".

As described above, according to the present embodiment, decrease in input impedance of the power transmitter 12 becomes substantially slower in comparison with increase in voltage of the AC power generator 11. Accordingly, even in the case of variation in transmission conditions, such as abrupt load variation and transmission distance variation, during voltage increase, overcurrent can be sufficiently prevented.

Sixth Embodiment

Figure 7:
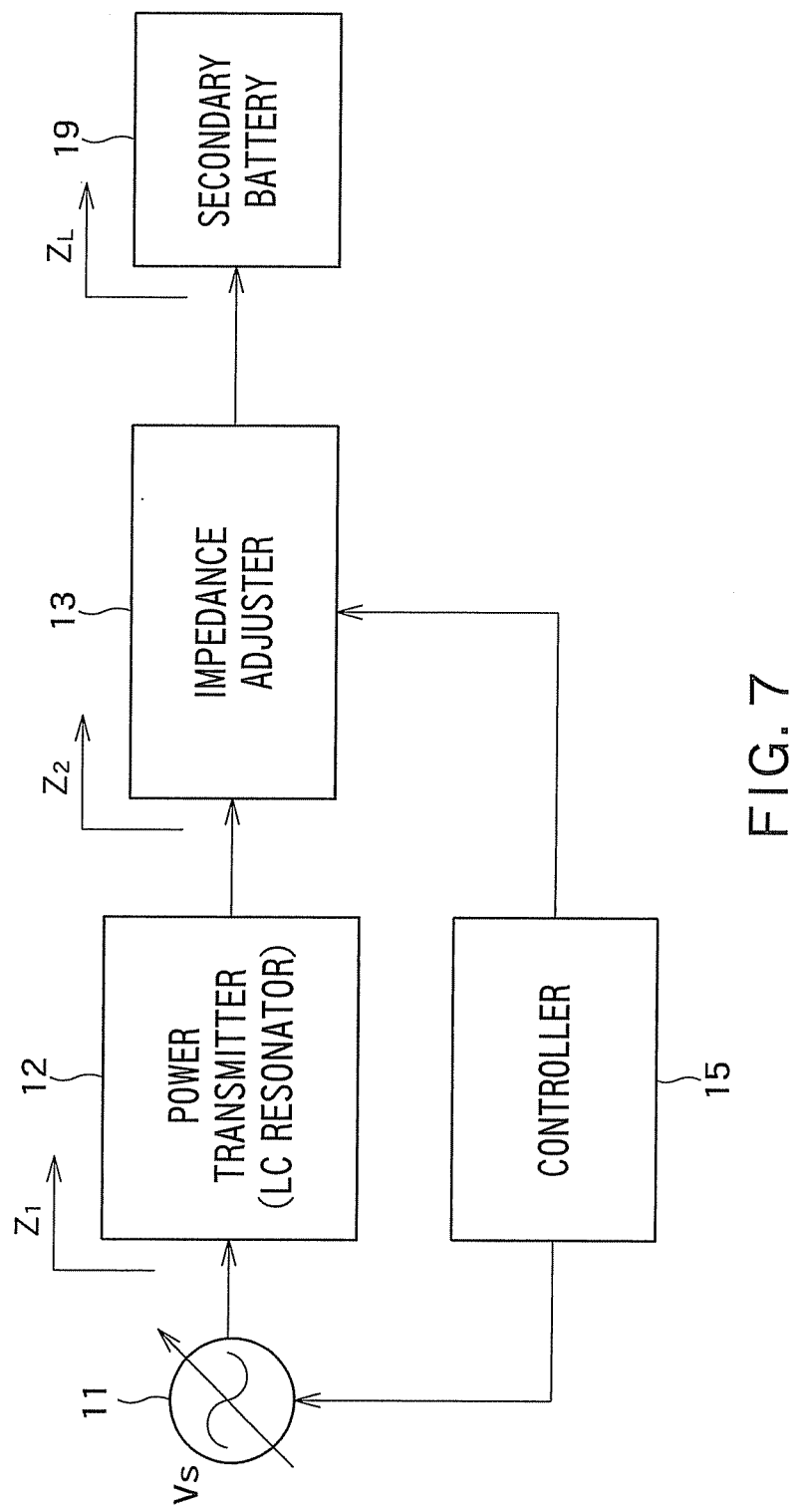
FIG. 7 is a diagram showing a wireless power transmitting apparatus according to a sixth embodiment.

FIG. 7 is a block diagram of a wireless power transmitting apparatus according to a sixth embodiment. As the load circuit 14 in FIG. 1(a), a secondary battery 19 is arranged. The wireless power transmitting apparatus is used for charging the secondary battery.

When the battery is charged, the current path is blocked to prevent reverse current in a state where the output voltage from the wireless power transmitting apparatus is lower than the voltage value of the secondary battery. The impedance "ZL" becomes significantly high. In this state, increase in AC voltage "Vs" causes overcurrent at the AC power generator 11.

Thus, according to the present embodiment, in a time period until the output voltage of the impedance adjuster 13 becomes higher than the voltage of the secondary battery 19, the controller 15 performs control such that the impedance "Z2" of the impedance adjuster 13 is sufficiently lower. This control can prevent failures in the AC power generator 11.

A conditioner for controlling charging current and voltage of the battery may be implemented in a secondary battery block or in the impedance adjuster 13.

As described above, according to the present embodiment, even in the case where the voltage value of the secondary battery 19 is high and load current does not flow unless the output voltage of the power transmitter 12 sufficiently increases, overcurrent can be prevented from occurring at the AC power generator 11.

Seventh Embodiment

Figure 8:
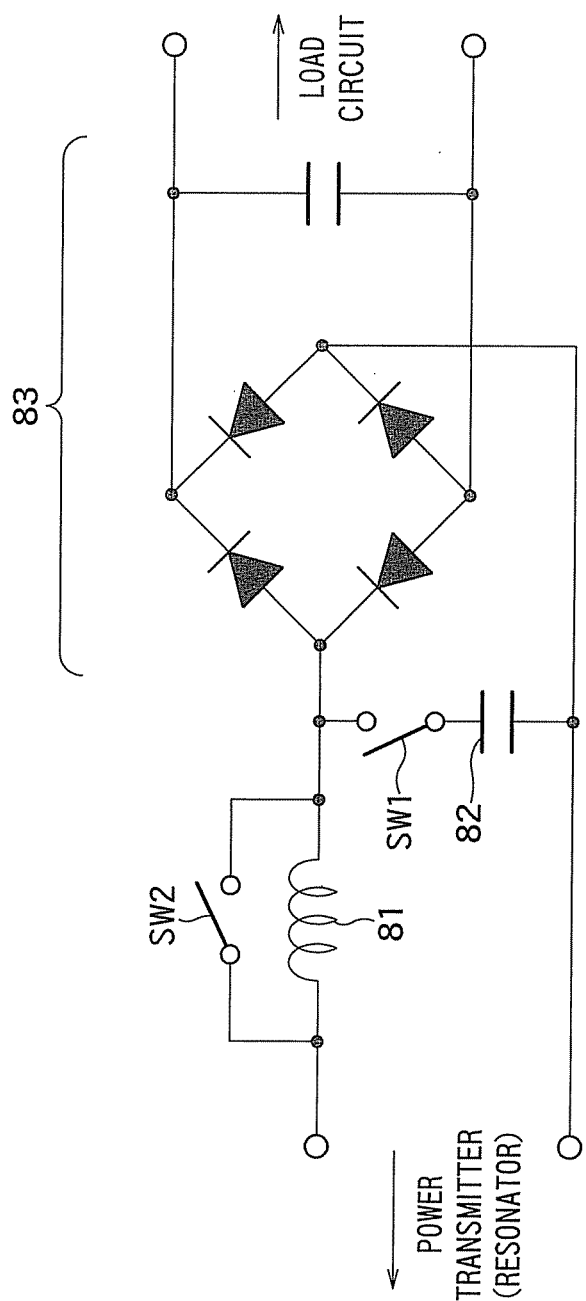
FIG. 8 is a diagram showing an example of a configuration of an impedance adjuster according to a seventh embodiment.

FIG. 8 is a block diagram showing an impedance adjuster in a wireless power transmitting apparatus according to a seventh embodiment.

Figure 4:
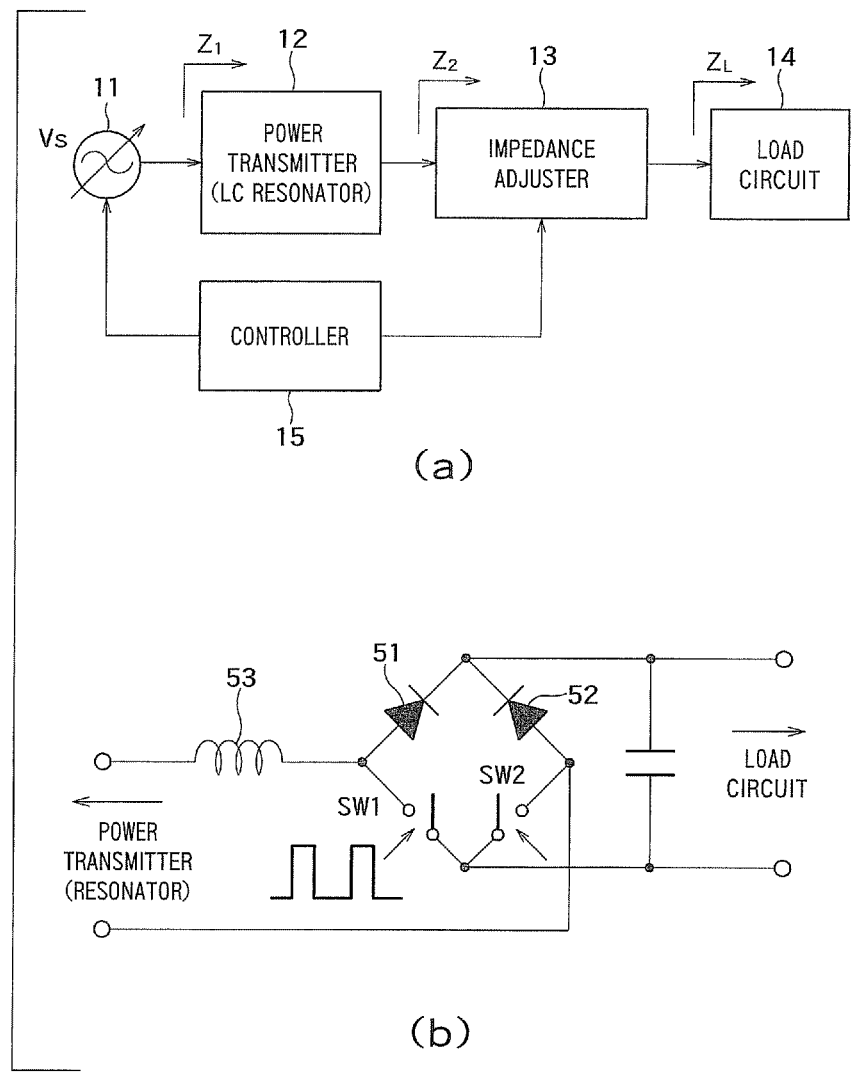
FIG. 4 shows diagrams showing an example of a configuration of an impedance adjuster according to a third embodiment.
Figure 5:
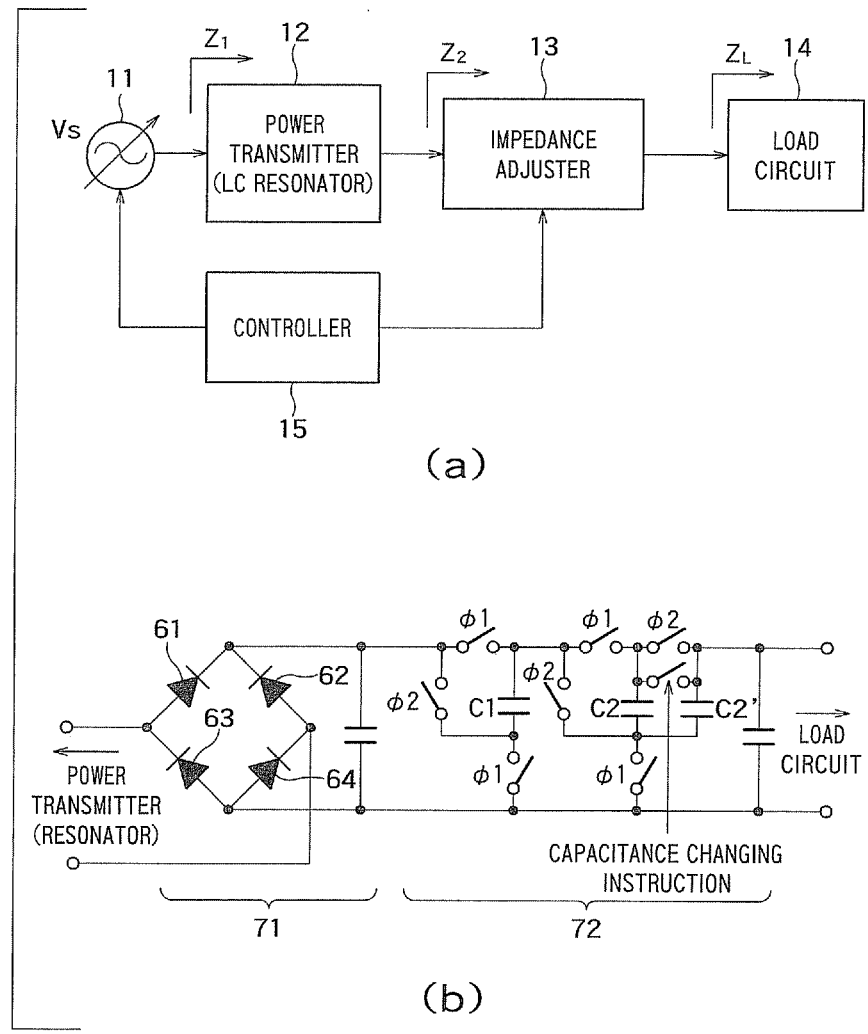
FIG. 5 shows diagrams showing an example of a configuration of an impedance adjuster according to a fourth embodiment.

The impedance adjusters shown in FIGS. 4 and 5 have the configuration of rectifying and boosting. The present embodiment describes another example.

As shown in FIG. 8, in this example, the impedance is adjusted using a coil 81 and a capacitive element 82 at an alternating current component and subsequently a circuit 83 performs rectification. Accordingly, the impedance of the load circuit becomes equivalently lower in view of the power transmitter. During impedance conversion, the switch SW1 is turned on and the switch SW2 is turned off. In a normal state, the switch SW1 is turned off and the switch SW2 is turned on.

In this example, the number of coils and the number of capacitive elements are only one. Accordingly, the impedance "Z2" cannot be gradually changed. However, a circuit including a combination of multiple coils, capacitive elements and switches enables the impedance "Z2" to be gradually changed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A power receiving device connectable with a first load circuit operating according to AC power from a power transmitting device, the power receiving device comprising:
a power receiver to receive the AC power from the power transmitting device via magnetic coupling;
an impedance adjuster capable of converting at least one of voltage and current of the AC power received at the power receiver; and
a controller to control an increase in output voltage of the power transmitting device,
wherein the AC power is supplied to the first load circuit via the impedance adjuster when the first load circuit is connected to the power receiving device, and
wherein the controller controls the impedance adjuster such that an input impedance of the impedance adjuster is lower than an input impedance of the first load circuit during at least a part of a time period in which the output voltage of the power transmitting device is increased.

2. The power receiving device according to claim 1, the power receiving device being connectable with a second load circuit operating according to the AC power received from the power transmitting device, and the power receiving device further comprising:
a switch to switch connection between the impedance adjuster and the second load circuit,
wherein the controller turns on the switch during at least a part of a time period in which the output voltage of the power transmitting device is increased.

3. The power receiving device according to claim 1, wherein the impedance adjuster comprises a switching converter, the switching converter including a plurality of switches and a plurality of capacitive elements, and
wherein the controller adjusts the input impedance of the impedance adjuster by controlling duty cycles of switching of the switches and charge and discharge of the capacitive elements.

4. The power receiving device according to claim 1, wherein the controller increases the input impedance of the impedance adjuster toward a first target value and increases the output voltage of the power transmitting device toward a second target value, and
wherein an increasing rate of the input impedance with respect to the first target value is lower than an increasing rate of the output voltage of the power transmitting device with respect to the second target value.

5. The power receiving device according to claim 1, wherein the power receiving device further comprises the first load circuit, and the first load circuit is a secondary battery.

6. A power transmitting device transmitting power to a power receiving device connectable to a load circuit, the power receiving device including a power receiver receiving AC power and an impedance adjuster transmitting the AC power received at the power receiver to the load circuit, the load circuit operating according to the AC power received via the impedance adjuster, and the power transmitting device comprising:
   an AC power generator to generate the AC power;
   a power transmitter to transmit the AC power to the power receiving device via magnetic coupling with the power receiver; and
   a controller to control an increase in output voltage of the AC power generator,
   wherein the controller controls the impedance adjuster such that an input impedance of the impedance adjuster is lower than an input impedance of the load circuit during at least a part of a time period in which the output voltage of the AC power generator is increased.

7. The power transmitting device according to claim 6, wherein the controller increases the input impedance of the impedance adjuster toward a first target value and increases the output voltage of the AC power generator toward a second target value, and an increasing rate of the input impedance with respect to the first target value is lower than an increasing rate of the output voltage of the AC power generator with respect to the second target value.

8. A control device controlling a power transmitting device and a power receiving device capable of supplying AC power received from the power transmitting device to a load circuit via an impedance adjuster in the power receiving device, wherein the control device controls an increase in output voltage of the power transmitting device, and controls the impedance adjuster such that an input impedance of the impedance adjuster is lower than an input impedance of the load circuit during at least a part of a time period in which the output voltage of the power transmitting device is increased.

9. The power receiving device according to claim 1, wherein the controller controls the output voltage of the power transmitting device and controls the impedance adjuster such that the input impedance of the impedance adjuster remains lower than the input impedance of the first load circuit during a time period over which the output voltage of the power transmitting device is increased to a target value, and the input impedance of the impedance adjuster gradually increases over the time period to its target value.

10. The power transmitting device according to claim 6, wherein the controller controls the output voltage of the AC power generator and controls the impedance adjuster such that the input impedance of the impedance adjuster remains lower than the input impedance of the load circuit during a time period over which the output voltage of the AC power generator is increased to a target value, and the input impedance of the impedance adjuster gradually increases over the time period to its target value.

11. The control device according to claim 8, wherein the control device controls the output voltage of the power transmitting device and controls the impedance adjuster such that the input impedance of the impedance adjuster remains lower than the input impedance of the load circuit during a time period over which the output voltage of the power transmitting device is increased to a target value, and the input impedance of the impedance adjuster gradually increases over the time period to its target value.

* * * * *